(12) United States Patent
Nagai et al.

(10) Patent No.: US 6,792,750 B2
(45) Date of Patent: Sep. 21, 2004

(54) EMISSION CONTROL APPARATUS OF INTERNAL COMBUSTION ENGINE AND CONTROL METHOD FOR THE EMISSION CONTROL APPARATUS

(75) Inventors: Toshinari Nagai, Sunto-gun (JP); Naoto Kato, Sunsono (JP); Akihiro Katayama, Toyota (JP); Kentaro Matsumoto, Numazu (JP); Shinji Kojima, Aichi (JP); Naoki Baba, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/224,384

(22) Filed: Aug. 21, 2002

(65) Prior Publication Data

US 2003/0046927 A1 Mar. 13, 2003

(30) Foreign Application Priority Data

Sep. 11, 2001  (JP) ........................................ 2001-275520

(51) Int. Cl.[7] .............................................. F01N 3/00
(52) U.S. Cl. ............................ 60/285; 60/274; 60/300; 123/198 F; 180/65.2
(58) Field of Search ....................... 60/274, 276, 285, 60/300; 123/198 F, 481; 180/65.2, 65.3, 65.4

(56) References Cited

U.S. PATENT DOCUMENTS 5,566,774 A * 10/1996 Yoshida ...................... 180/65.4
5,801,499 A * 9/1998 Tsuzuki et al. ............. 180/65.2
5,970,707 A * 10/1999 Sawada et al. ................ 60/276
6,059,057 A * 5/2000 Yamazaki et al. .......... 180/65.2
6,266,956 B1 * 7/2001 Suzuki et al. .................. 60/300
6,282,889 B1 * 9/2001 Kakuyama et al. ............ 60/285
6,321,530 B1 * 11/2001 Hoshi et al. ................... 60/274
6,397,963 B1 * 6/2002 Lennevi ...................... 180/65.2
6,434,928 B1 * 8/2002 Manaka ......................... 60/285

FOREIGN PATENT DOCUMENTS

JP          A 5-195842       8/1993

* cited by examiner

*Primary Examiner*—Tu M. Nguyen
(74) *Attorney, Agent, or Firm*—Oliff & Berridge, PLC

(57) ABSTRACT

A catalytic emission control apparatus of an internal combustion engine that has an engine stop mode of stopping the internal combustion engine during a run of a vehicle utilizes an oxygen absorption-storage action of an emission control catalyst disposed in an exhaust passage of the internal combustion engine. The emission control apparatus has a storage computing device that computes a storage of oxygen in the emission control catalyst, and air-fuel ratio controller performs an air-fuel ratio control of the internal combustion engine based on the storage of oxygen computed by the storage computing device. The storage computing device computes the storage of oxygen during the engine stop mode of the internal combustion engine. The air-fuel ratio controller performs the air-fuel ratio control when the internal combustion engine is restarted after the engine stop mode is discontinued, based on the storage of oxygen computed by the storage computing device during the engine stop mode.

16 Claims, 7 Drawing Sheets

EMISSION CONTROL APPARATUS OF INTERNAL COMBUSTION ENGINE AND CONTROL METHOD FOR THE EMISSION CONTROL APPARATUS

INCORPORATED BY REFERENCE

The disclosure of Japanese Patent Applications No. 2001-275520 filed on Sep. 11, 2001, including its specification, drawings and abstract, is incorporated herein by reference in its entirety.

BACKGROUND OF THE INVENTION

1. Field of the Invention

The invention relates to a catalytic emission control apparatus and a control method for the emission control apparatus, that controls emission by using an emission control catalyst.

2. Description of the Related Art

Substances contained in exhaust gas from an internal combustion engine, such as nitrogen oxides NOx, carbon monoxide CO, hydrocarbons HC, etc., are removed or lessened by a three-way catalyst disposed in an exhaust passage. In diesel engines, a four-way catalyst for removing or lessening particulate matter in addition to the aforementioned substances is employed.

SUMMARY OF THE INVENTION

An emission control catalyst also has a property of absorbing and storing oxygen. Utilizing the oxygen storage function, an attempt has been made to further improve the removal rates of the aforementioned substances. The present inventors have conducted further researches for more effective emission control based on the oxygen absorption-storage action of an emission control catalyst, and have accomplished the invention. That is, it is an object of the invention to provide an internal combustion engine emission control apparatus and a control method for the emission control apparatus, capable of further improving the emission control performance of the emission control catalyst by utilizing the oxygen absorption-storage action of the emission control catalyst.

Furthermore, the inventors have accomplished an emission control apparatus capable of further improving the emission control performance in a hybrid vehicle, by focusing attention on the amount of a specific component let out of the emission control catalyst. That is, it is another object of the invention to provide an internal combustion engine emission control apparatus and a control method for the emission control apparatus, capable of further improving the emission control performance of the emission control catalyst based on the amount of the specific component in exhaust gas flowing out of the emission control catalyst.

A first aspect of the invention is an emission control apparatus of an internal combustion engine that has an engine stop mode of stopping an engine during a run of a vehicle, the emission control apparatus utilizing an oxygen absorption-storage action of an emission control catalyst disposed in an exhaust passage of the internal combustion engine. The emission control apparatus includes a storage computing device that computes a storage of oxygen in the emission control catalyst, and air-fuel ratio controller that performs an air-fuel ratio control of the internal combustion engine based on the storage of oxygen computed by the storage computing device. The storage computing device computes the storage of oxygen during the engine stop mode of the internal combustion engine. The air-fuel ratio controller performs the air-fuel ratio control when the engine is restarted after the engine stop mode is discontinued, based on the storage of oxygen computed by the storage computing device during the engine stop mode.

Examples of the vehicle that has the engine stop mode include generally termed hybrid vehicles that have an internal combustion engine and an electric motor as drive power sources, vehicles equipped with a generally termed idle stop system that stops the engine (prevents idling) when the vehicle stops at an intersection and the like, etc.

According to the first aspect, even during the engine stop mode, the storage of oxygen is computed, and the air-fuel ratio control following restart of the engine is performed based on the oxygen absorption-storage capability. Therefore, deterioration of the emission control performance immediately after restart of the engine can be prevented, so that the emission control performance can be further improved.

In the first aspect, the air-fuel ratio controller may determine a change in the air-fuel ratio within a predetermined time following a restart of the engine, based on the storage of oxygen computed by the storage computing device during the engine stop mode, when the air-fuel ratio control is performed at a time of a restart of the engine. Therefore, deterioration of the emission control performance can be further improved.

In accordance with a second aspect of the invention, an emission control apparatus of an internal combustion engine of a hybrid vehicle that is run via the internal combustion engine and an electric motor utilizes an emission control catalyst disposed in an exhaust passage of the internal combustion engine. The emission control apparatus includes an output distribution controller that controls a distribution between an output of the internal combustion engine and an output of the electric motor. The output distribution controller controls the distribution of output between the internal combustion engine and the electric motor based on a condition parameter of an exhaust system of the internal combustion engine.

In the second aspect, the emission control apparatus may include a storage computing device that computes a storage of oxygen in the emission control catalyst, and the output distribution controller may control the distribution of output between the internal combustion engine and the electric motor so that the storage of oxygen computed by the storage computing device is within a predetermined range.

According to the above aspect of the invention, by controlling the output distribution so that the storage of oxygen becomes within a predetermined range in a hybrid vehicle, the driving by the electric motor is effectively employed so as to further improve the emission control performance using the oxygen absorption-storage action without deterioration in the drivability of the vehicle.

In the above aspect, an air-fuel ratio feedback control based on an exhaust air-fuel ratio may be performed if the storage of oxygen computed by the storage computing device is within a predetermined range. Therefore, the emission control utilizing the oxygen absorption-storage action and the emission control based on the air-fuel ratio feedback control are made compatible with each other at a high level, so that the emission control can be effectively performed.

In the second aspect, the output distribution controller may control the distribution of output between the internal combustion engine and the electric motor so that an amount of a specific component in an exhaust gas that flows out of the emission control catalyst is within a predetermined range.

According to the above aspect, the output distribution is controlled in a hybrid vehicle so that the amount of the specific component in exhaust gas flowing out of the emission control catalyst is within the predetermined range. Therefore, the emission control performance can be further improved.

In the above aspect, if the amount of the specific component in the exhaust gas that flows out of the emission control catalyst is within the predetermined range, an air-fuel ratio feedback control based on an exhaust air-fuel ratio may be performed.

If the amount of the specific component in the exhaust gas that flows out of the emission control catalyst is within a predetermined range, a normal air-fuel ratio feedback control is performed on the internal combustion engine. Therefore, the emission control based on the control of the amount of the specific component and the emission control based on the air-fuel ratio feedback control are made compatible with each other at a high level. Hence, effective emission control can be accomplished.

In accordance with a third aspect of the invention, an emission control apparatus of an internal combustion engine of a hybrid vehicle that is run via the internal combustion engine and an electric motor utilizes an oxygen absorption-storage action of an emission control catalyst disposed in an exhaust passage of the internal combustion engine. The emission control apparatus includes an absorption-storage capability computing device that computes an oxygen absorption-storage capability of the emission control catalyst, and an output distribution controller that controls a distribution between an output of the internal combustion engine and an output of the electric motor. The absorption-storage capability computing device computes the oxygen absorption-storage capability by serially performing a fuel stop and a rich operation. At a time of computation of an oxygen absorption-storage capability by the absorption-storage capability computing device, the output distribution controller controls the distribution of output between the internal combustion engine and the electric motor so as to provide an output required of the vehicle.

According to the third aspect, the fuel stop and the rich operation are serially performed in the hybrid vehicle, so that the oxygen absorption-storage capability can be accurately detected at an earlier timing. Therefore, the emission control performance utilizing the oxygen absorption-storage action can be further improved.

In accordance with a fourth aspect of the invention, an emission control apparatus of an internal combustion engine of a hybrid vehicle that is run via the internal combustion engine and an electric motor utilizes an oxygen absorption-storage action of an emission control catalyst disposed in an exhaust passage of the internal combustion engine. The emission control apparatus includes an absorption-storage capability computing device that computes an oxygen absorption-storage capability of the emission control catalyst, and an output distribution control device that controls a distribution between an output of the internal combustion engine and an output of the electric motor. The absorption-storage capability computing device computes the oxygen absorption-storage capability by serially performing a lean operation and a rich operation near a limit within a maximum range of combustible air-fuel ratios. At a time of computation of an oxygen absorption-storage capability by the absorption-storage capability computing device, the output distribution controller controls the distribution of output between the internal combustion engine and the electric motor so as to provide an output required of the vehicle.

According to the fourth aspect of the invention, the lean operation and the rich operation are serially performed near the limit of combustible air-fuel ratios in the hybrid vehicle, so that the oxygen absorption-storage capability can be accurately detected at a early timing without deterioration of the drivability. Therefore, the oxygen absorption-storage capability based on the oxygen absorption-storage action can be further improved.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENTS

Preferred embodiments of the emission control apparatus of the invention will be described hereinafter with reference to the accompanying drawings. The emission control apparatus controls exhaust emission from an engine (internal combustion engine) 1. The engine 1 is installed in a vehicle (hybrid vehicle) together with a motor-generator (electric motor) 32 described below. The internal combustion engine (and its oxygen absorption-storage function) will first be described. After that, a vehicle construction, including a relationship between the internal combustion engine and the electric motor, will be described.

Figure 1:
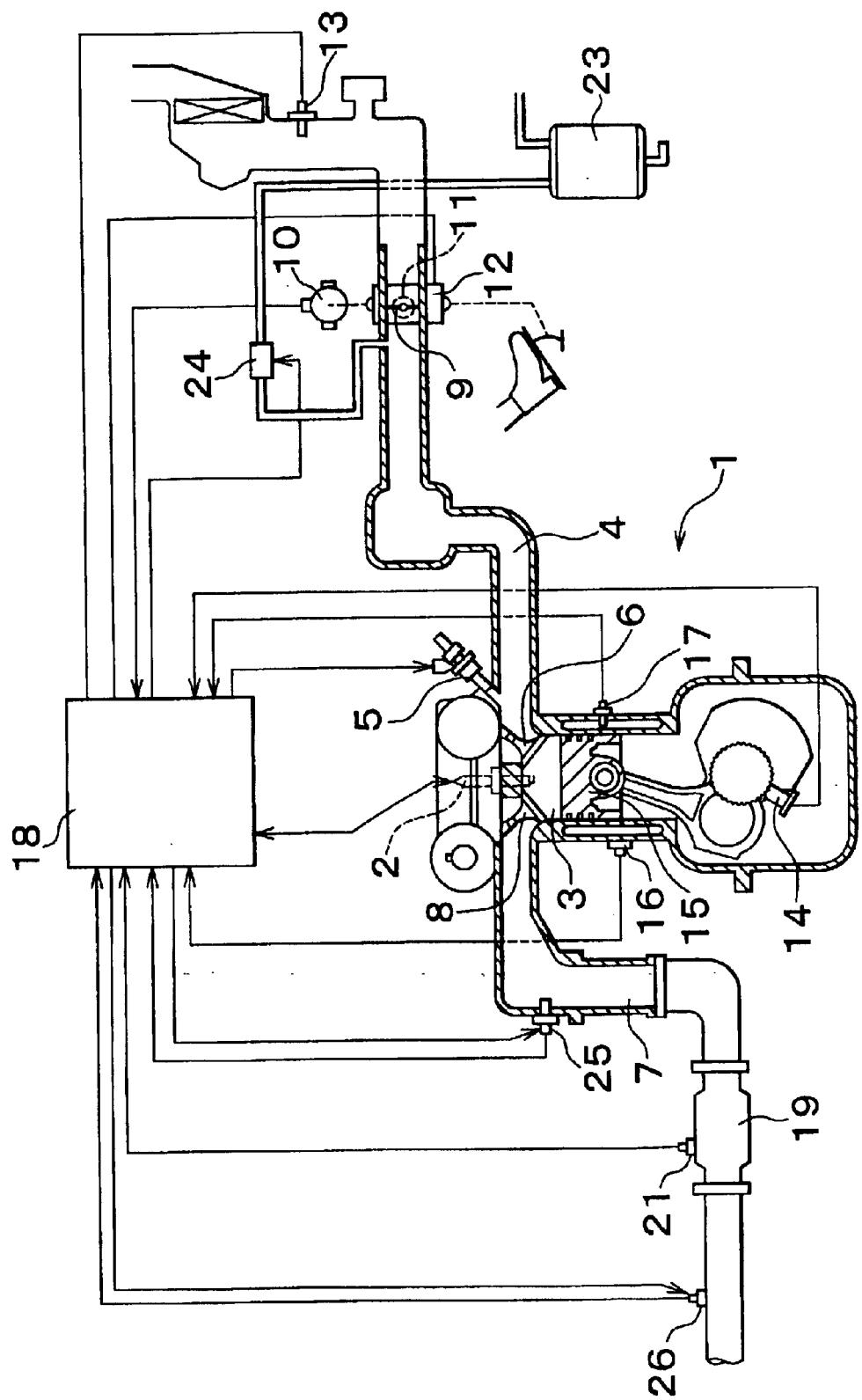
FIG. 1 is a sectional view of an internal combustion engine (and peripheral portions of the engine) having an embodiment of the emission control apparatus of the invention.

FIG. 1 illustrates a construction of an internal combustion engine having an emission control apparatus in accordance with embodiments described below. Although the engine 1 has a plurality of cylinders, only one of the cylinders is shown in a sectional view in FIG. 1. As indicated in FIG. 1, the engine 1 produces drive force through combustion of air-fuel mixture within each cylinder 3 by using an ignition plug 2. For the combustion in the engine 1, air drawn in from outside flows through an intake passage 4, and mixes with fuel injected from an injector 5. The air-fuel mixture is introduced into the cylinder 3. Communication between the interior of the cylinder 3 and the intake passage 4 is governed by opening and closing an intake valve 6. After air-fuel mixture burns in the cylinder 3, exhaust gas is discharged into an exhaust passage 7. Communication between the interior of the cylinder 3 and the exhaust passage 7 is governed by opening and closing an exhaust valve 8.

A throttle valve 9 for adjusting the amount of intake air drawn into the cylinder 3 is disposed in the intake passage 4. The throttle valve 9 is connected to a throttle position sensor 10 for detecting the degree of opening of the throttle valve 9. The throttle valve 9 is connected to a throttle motor 11, and is opened and closed by drive force of the throttle motor 11. Disposed near the throttle valve 9 is an accelerator position sensor 12 for detecting an amount of operation (degree of depression) of an accelerator pedal. In this embodiment, an electronic control throttle system that electronically controls the degree of depression of the throttle valve 9 is adopted. Furthermore, an air flow meter 13 for detecting the amount of intake air is attached to the intake passage.

A crank position sensor 14 for detecting the position of a crankshaft of the engine 1 is disposed near the crankshaft. The position of a piston 15 within the cylinder 3 and the engine rotation speed NE can be determined from output of the crank position sensor 14. The engine 1 is also provided with a knock sensor 16 for detecting the knocking of the engine 1, and a water temperature sensor 17 for detecting the temperature of cooling water.

An emission control catalyst 19 is disposed in the exhaust passage 7. The emission control catalyst may be provided at a plurality of sites in the exhaust passage. That is, a plurality of emission control catalysts may be provided in series, or in branch passages in a parallel fashion. For example, in the case of a four-cylinder engine, an emission control catalyst is disposed at a site where the exhaust pipes of two of the cylinders merge into one pipe, and another emission control catalyst is disposed at another site where the exhaust pipes of the other two cylinders merge into one pipe. In the embodiment, one emission control catalyst 19 is disposed at a site where the exhaust pipes of the cylinders 3 merge into two pipes.

The ignition plug 2, the injector 5, the throttle position sensor 10, the throttle motor 11, the accelerator position sensor 12, the air flow meter 13, the crank position sensor 14, the knock sensor 16, the water temperature sensor 17, and other sensors and the like are connected to an electronic control unit for generally controlling the engine 1 (engine ECU 18), and are controlled based on signals from the engine ECU 18, or send out results of detection to the engine ECU 18. Also connected to the engine ECU 18 are a catalyst temperature sensor 21 for measuring the temperature of the emission control catalyst 19 disposed in the exhaust passage 7, and a purge control valve 24 for purging fuel tank-originating fuel vapor collected by a charcoal canister 23 into the intake passage.

Also connected to the engine ECU 18 are an upstream-side air-fuel ratio sensor 25 disposed at an upstream side of the emission control catalyst 19, and a downstream-side air-fuel ratio sensor 26 disposed at a downstream side of the emission control catalyst 19. The upstream-side air-fuel ratio sensor 25 detects the exhaust air-fuel ratio from the oxygen concentration in exhaust gas at the location of attachment the upstream-side air-fuel ratio sensor 25. The downstream-side air-fuel ratio sensor 26 detects the exhaust air-fuel ratio from the oxygen concentration in exhaust gas at the location of attachment the downstream-side air-fuel ratio sensor 26. The air-fuel ratio sensors 25, 26 may be linear air-fuel ratio sensors that linearly detect the exhaust air-fuel ratio, or oxygen sensors that detect the exhaust air-fuel ratio in an on-off fashion. Since the air-fuel ratio sensors 25, 26 cannot perform accurate detection until a predetermined temperature (activation temperature) is reached, the air-fuel ratio sensors 25, 26 are warmed by electric power supplied via the engine ECU 18 in order to quickly raise the temperature of the sensors to the activation temperature.

The engine ECU 18 has a CPU that performs various computations, a RAM for storing various information quantities such as results of computations and the like, a backup RAM whose storage contents are retained via a battery, a ROM that stores various control programs, etc. The engine ECU 18 controls the engine 1 based on the air-fuel ratio, and computes the amount of oxygen stored in the emission control catalyst 19. Furthermore, the engine ECU 18 computes the amount of fuel to be injected by the injector 5, and the ignition timing of the ignition plug 2, and performs diagnostics of the sensors. The engine ECU 18 controls the engine 1 based on the detected exhaust air-fuel ratio, the computed amount of oxygen stored, etc.

Next described will be computation (estimation) of the amount of oxygen stored and the oxygen absorption-storage capability.

A three-way catalyst used as an emission control catalyst contains ceria ($CeO_2$) and other components, and has a property of absorbing oxygen from exhaust gas and releasing oxygen into exhaust gas, in addition to the property of oxidizing and reducing the components to be removed from exhaust gas. The emission control catalyst 19 in this embodiment has the property of absorbing and releasing oxygen.

The oxygen absorption-storage action can be utilized as follows. That is, when the exhaust air-fuel ratio of exhaust gas flowing into the emission control catalyst 19 is a fuel lean-side ratio, oxygen in exhaust gas is absorbed to the emission control catalyst 19, so that a state near a reducing atmosphere is developed and therefore reduction of surplus nitrogen oxides NOx (emission control) can be accelerated. Conversely, when the exhaust air-fuel ratio of exhaust gas flowing into the emission control catalyst 19 is a fuel rich-side ratio, stored oxygen is released, so that surplus carbon monoxide CO and surplus hydrocarbons HC are oxidized and thereby emission control is accelerated. Thus, utilizing the property of absorbing and releasing oxygen, the emission control efficiency can be improved.

However, if the emission control catalyst 19 has already absorbed oxygen up to a limit of the oxygen absorption-storage capability of the catalyst when the exhaust air-fuel ratio of inflowing exhaust gas becomes a lean-side air-fuel ratio, the emission control catalyst 19 is not able to absorb any more oxygen, so that nitrogen oxides NOx cannot be sufficiently removed from exhaust gas. Conversely, if the emission control catalyst 19 has already released oxygen and therefore stores no oxygen when the exhaust air-fuel ratio of inflowing exhaust gas becomes a rich-side air-fuel ratio, no oxygen is released from the emission control catalyst 19, so that sufficient removal of carbon monoxide CO and hydrocarbons HC from exhaust gas cannot be achieved.

Therefore, a target value of the amount of oxygen stored is set such that the emission control catalyst 19 can perform regardless of whether the exhaust gas ratio of inflowing exhaust gas becomes a lean-side ratio or a rich-side ratio, and a control is performed so that the amount of oxygen stored becomes equal to the target value. In this control, the amount of oxygen stored in the emission control catalyst 19 is estimated, and an oxygen absorption-storage capability (also referred to as "oxygen storage capacity", "maximum oxygen storage", etc.) is estimated by using history of the estimated storage of oxygen.

Figure 2:
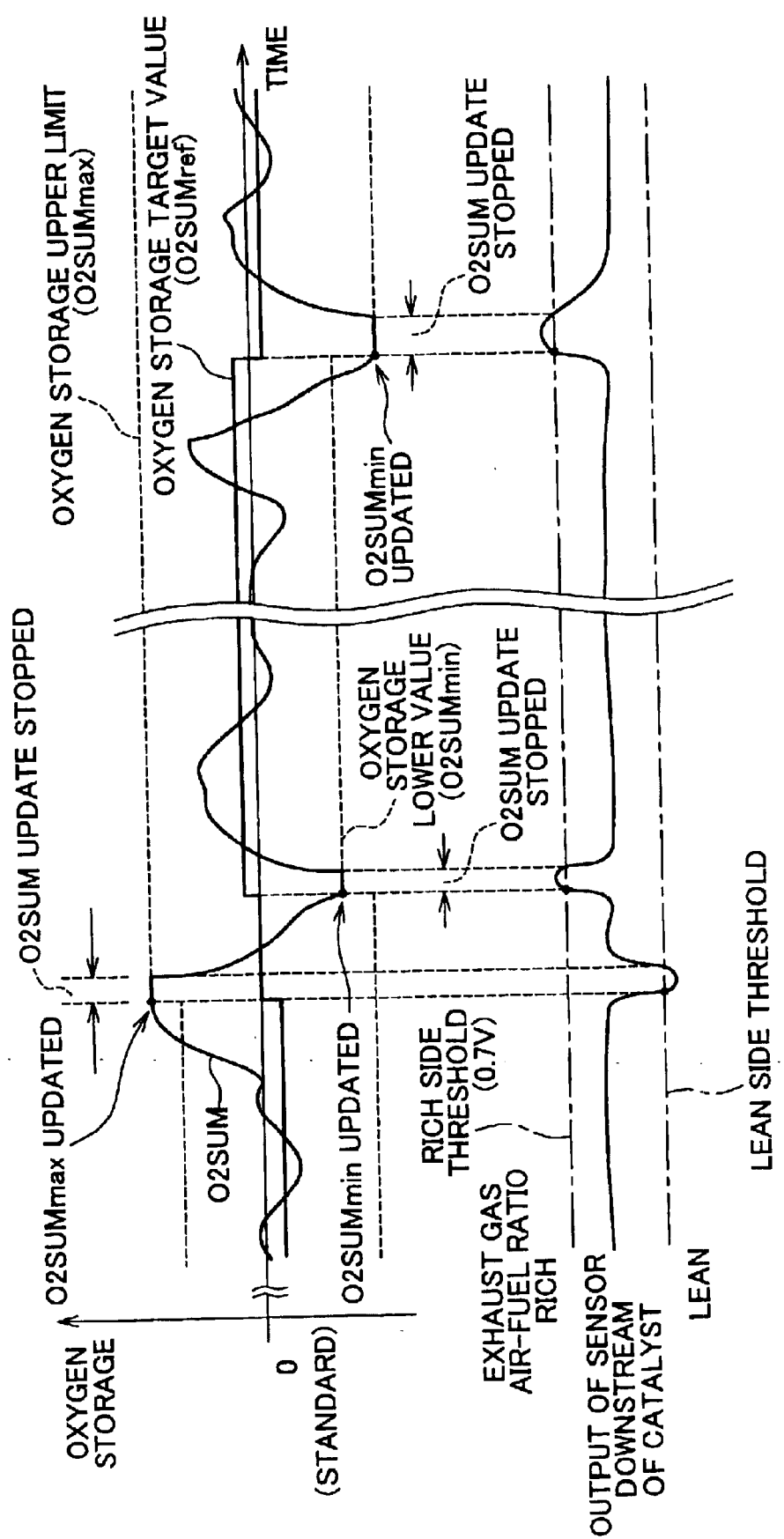
FIG. 2 is a timing chart indicating the oxygen storage O2SUM in an emission control catalyst, the target value O2SUMref of the oxygen storage O2SUM, and the downstream-side air-fuel ratio sensor output.

FIG. 2 indicates time-dependent changes of control variables related to estimation of the storage of oxygen in the emission control catalyst 19. The oxygen storage O2SUM is determined by estimating an oxygen absorption/release value O2AD, that is, an amount of oxygen absorbed into or released from the emission control catalyst 19, from a difference $\Delta AF=(AF-AFst)$ between the upstream-side exhaust air-fuel ratio AF detected by the upstream-side air-fuel ratio sensor 25 disposed upstream of the emission control catalyst 19 and a stoichiometric air-fuel ratio AFst, and integrating the estimated oxygen absorption/release O2AD. The oxygen absorption/release O2AD being positive in value means absorption of oxygen into the emission control catalyst 19. The oxygen absorption/release O2AD being negative in value means release of oxygen from the catalyst 19.

Figure 3:
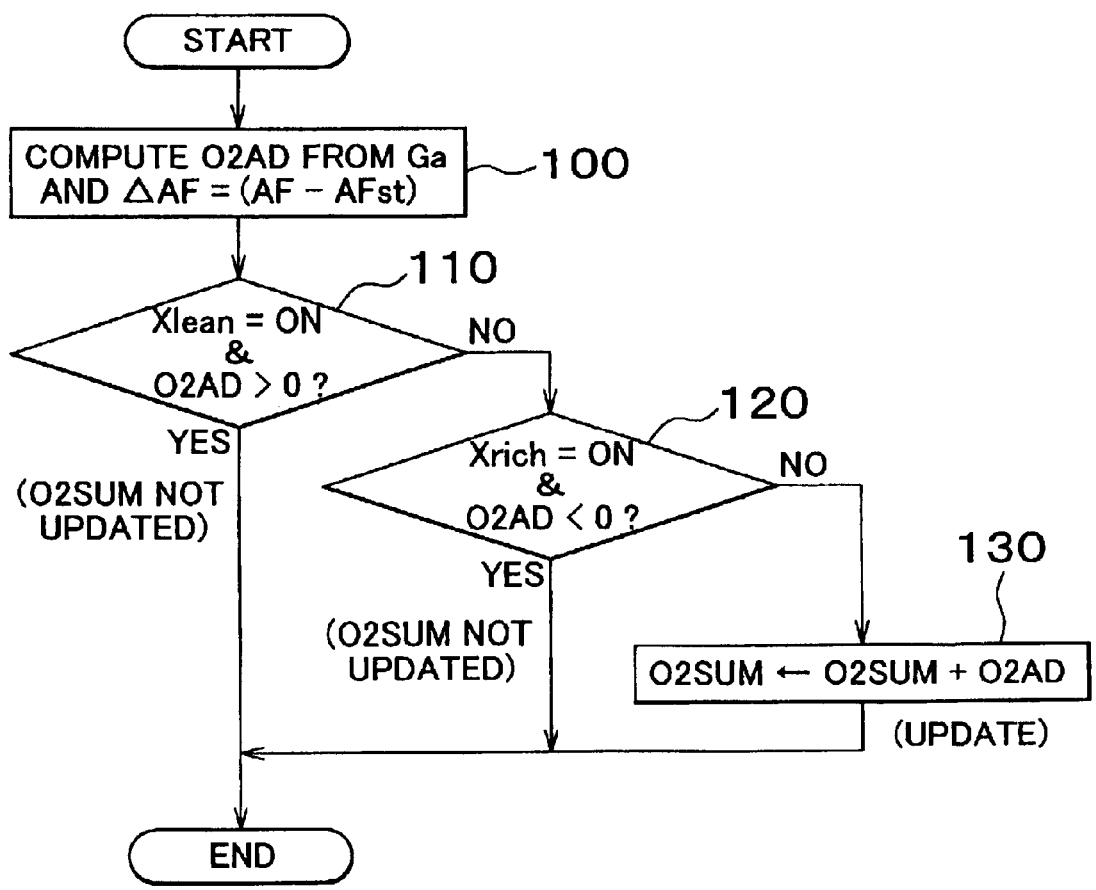
FIG. 3 is a flowchart illustrating a control of updating the oxygen storage O2SUM.

The computation of the oxygen storage O2SUM will be described with reference to the flowchart of FIG. 3. In this embodiment, the oxygen storage O2SUM is computed with a certain time point (e.g., the time at which the ignition switch is turned on) being determined as a standard (O2SUM=0). That is, the oxygen storage O2SUM is increased by addition when oxygen is absorbed by the emission control catalyst 19. When oxygen is released from the emission control catalyst 19, the oxygen storage O2SUM is reduced by subtraction. Since there are cases where the emission control catalyst 19 has already absorbed oxygen at the aforementioned time point, the oxygen storage O2SUM can assume negative values as well as positive values.

First, the exhaust air-fuel ratio AF of inflow gas to the emission control catalyst 19 is detected by the upstream-side air-fuel ratio sensor 25, and a difference $\Delta AF=(AF-AFst)$ between the exhaust air-fuel ratio AF and the stoichiometric air-fuel ratio AFst is determined by the engine ECU 18. The amount of intake air Ga is detected by the air flow meter 13. From the amount of intake air Ga and the air-fuel ratio difference $\Delta AF$, the oxygen absorption/release O2AD, that is, the amount of oxygen absorbed to or released from the emission control catalyst 19, is computed (step 100). The oxygen absorption/release O2AD may be determined from a map stored in the engine ECU 18, or may be computed by using a calculation formula stored in the engine ECU 18.

After step 100, it is determined (step 110) whether regarding the exhaust air-fuel ratio of gas flowing out of the emission control catalyst 19, a lean flag Xlean is on, and the computed oxygen absorption/release O2AD is a positive value. The lean flag Xlean and a rich flag Xrich will be briefly described. If the exhaust air-fuel ratio detected by the downstream-side air-fuel ratio sensor 26 disposed downstream of the emission control catalyst 19 is on the lean side of a stoichiometric air-fuel ratio, the lean flag Xlean is turned on. If the exhaust air-fuel ratio detected is on the rich side of the stoichiometric air-fuel ratio, the rich flag Xrich is turned on. The lean flag Xlean and the rich flag Xrich will be detailed below.

In step 110, the on-state of the lean flag Xlean means that the exhaust air-fuel ratio of outflow gas from the emission control catalyst 19 is on the lean side, and oxygen exists in a surplus amount. The oxygen absorption/release O2AD being positive in value means that gas flowing into the emission control catalyst 19 contains oxygen that can be absorbed. Therefore, an affirmative determination at step 110 means that the inflow gas to the emission control catalyst 19 contains oxygen that can be absorbed into the catalyst, but the emission control catalyst 19 has already absorbed oxygen up to the limit, and therefore cannot absorb any more oxygen.

Therefore, if the determination at step 110 is affirmatively made, the routine immediately ends without updating the oxygen storage O2SUM of the emission control catalyst 19. Update of the oxygen storage O2SUM following the affirmative determination at step 110 would mean absorption of oxygen that is actually impossible. Therefore, if the determination at step 110 is affirmatively made, update of the oxygen storage O2SUM is prohibited. If the determination at step 110 is negatively made, it is then determined whether the rich flag Xrich is on and the computed oxygen absorption/release O2AD is negative in value (step 120).

The on-status of the rich flag Xrich means that the exhaust air-fuel ratio of outflow gas from the emission control catalyst 19 is on the fuel-rich side and oxygen is scarce in the outflow gas. The oxygen absorption/release O2AD being negative in value can be said to mean that the exhaust air-fuel ratio of inflow gas to the emission control catalyst 19 is on the fuel-rich side and oxygen stored in the emission control catalyst 19 should be released in order to clean exhaust gas. Therefore, the affirmative determination at step 120 means that whereas the inflow gas to the emission control catalyst 19 is in such a state that the gas should be cleaned by oxygen released from the emission control catalyst 19, the emission control catalyst 19 has already released oxygen completely, and therefore cannot release any more oxygen.

Therefore, if the determination at step 120 is affirmatively made, the update of the oxygen storage O2SUM of the emission control catalyst 19 is no longer performed. Update of the oxygen storage O2SUM following the affirmative determination at step 120 would mean release of oxygen that is actually impossible. Therefore, if the determination at step 120 is affirmatively made, update of the oxygen storage O2SUM is prohibited. If the determination at step 120 is negatively made, the present state is neither the state where the inflow gas contains oxygen that can be absorbed into the catalyst but the catalyst has absorbed oxygen up to the limit, nor the case where oxygen should be released but the catalyst has completely released oxygen. Then, the oxygen storage O2SUM is updated using the computed oxygen absorption/release O2AD at step 130.

Thus, the above-described update of the oxygen storage O2SUM using the oxygen absorption/release O2AD (which is prohibited if an affirmative determination is made in step 10 or step 120) makes it possible to always estimate an accurate amount of oxygen stored in the emission control catalyst 19. A history of the oxygen storage O2SUM generated as described above is indicated in an upper stage of the timing chart of FIG. 2. The serially updated oxygen storage O2SUM is serially stored in the engine ECU 18.

In the foregoing description, the oxygen absorption/release O2AD is computed (step 100) from the difference $\Delta AF$ between the exhaust air-fuel ratio AF detected by the upstream-side air-fuel ratio sensor 25 and the stoichiometric air-fuel ratio AFst, and amount of intake air Ga detected by the air flow meter 13. However, the absorption-release reactions of oxygen on the emission control catalyst 19 can occur during a stop of the engine 1 (a state where exhaust gas does not flow into the emission control catalyst 19). Even in a condition where there is substantially no movement of exhaust gas in the emission control catalyst 19, the absorption-release reactions of oxygen can progress. Furthermore, the absorption-release reactions of oxygen can also occur while exhaust gas in the emission control catalyst 19 moves by thermal convection.

In this embodiment, the oxygen absorption/release O2AD is computed even during a situation where the exhaust gas does not actively flow into the emission control catalyst 19. The oxygen absorption/release O2AD is computed by factoring in change in temperature and the reaction coefficient due to gas diffusion. With regard to a stop of the engine 1, intake air directly reaches the emission control catalyst 19 so that a great amount of oxygen can be absorbed into the emission control catalyst 19 until rotation of the engine 1 completely stops after the stop of fuel injection. In this embodiment, the aforementioned situation is taken into consideration, in computing the oxygen absorption/release O2AD.

Figure 4:
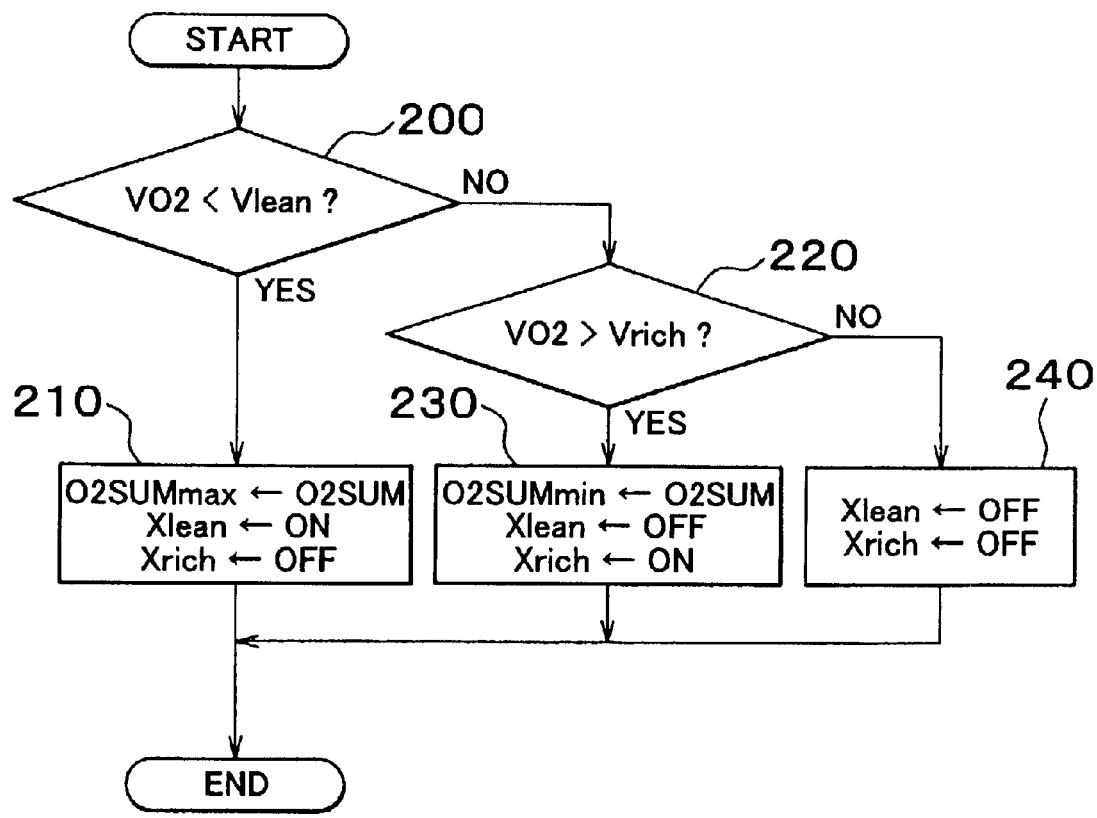
FIG. 4 is a flowchart illustrating a control of updating an upper limit O2SUMmax and a lower limit O2SUMmin of the oxygen storage O2SUM.

Next, computation of an upper limit O2SUMmax and a lower limit O2SUMmin of the oxygen storage O2SUM, and the oxygen absorption-storage capability will be described with reference to the flowchart of FIG. 4.

First, it is determined (step 200) whether the output voltage VO2 of the downstream-side air-fuel ratio sensor 26 is less than a lean-side threshold Vlean (specifically, 0.3 V in this embodiment). This is indicated in the lower portion of the timing chart of FIG. 2. If the output voltage VO2 is less than the lean-side threshold Vlean, it is considered that the emission control catalyst 19 has absorbed oxygen up to the limit of the oxygen absorption-storage capability, and therefore cannot absorb any more oxygen. Therefore, if the determination at step 200 is affirmatively made, it is considered that the oxygen storage O2SUM has reached the upper limit, and the present oxygen storage O2SUM is stored as an upper limit O2SUMmax. As for the flags that indicate the state of the exhaust air-fuel ratio downstream of the emission control catalyst 19, the lean flag Xlean is set to the on-state, and the rich flag Xrich is set to the off-state (step 210).

If the determination at step 200 is negatively made, it is determined (step 220) whether the output voltage VO2 of the downstream-side air-fuel ratio sensor 26 is greater than a predetermined rich-side threshold Vrich (specifically, 0.7 V in this embodiment). If the output voltage VO2 is greater than the rich-side threshold Vrich, it is considered that the emission control catalyst 19 does not store oxygen, and cannot release any more oxygen. Therefore, if the determination at step 220 is affirmatively made, it is considered that the oxygen storage O2SUM has reached the lower limit, and the present oxygen storage O2SUM is stored as a lower limit O2SUMmin in the engine ECU 18. As for the flags for indicating the state of the exhaust air-fuel ratio downstream of the emission control catalyst 19, the lean flag Xlean is set to the off-state, and the rich flag Xrich is set to the on-state (step 230).

If the determination at step 220 is negatively made, the output voltage VO2 of the downstream-side air-fuel ratio sensor 26 is between the lean-side threshold Vlean and the rich-side threshold Vrich (Vlean≦VO2≦Vrich), and therefore, it can be considered that the exhaust air-fuel ratio of gas flowing out of the emission control catalyst 19 is not extremely on either the lean side or the rich side, but is near the stoichiometric air-fuel ratio. In this case, both the lean flag Xlean and the rich flag Xrich are set to the off-state (step 240).

As described above, the oxygen storage O2SUM is sequentially updated. On the basis of the history and the output of the downstream-side air-fuel ratio sensor 26, the upper limit O2SUMmax and the lower limit O2SUMmin are updated. Therefore, by determining a difference between the upper limit O2SUMmax and the lower limit O2SUMmin (O2SUMmax−O2SUMmin), the maximum amount of oxygen storable in the emission control catalyst 19 (oxygen absorption-storage capability) can be determined. The oxygen absorption-storage capability of the emission control catalyst 19 varies depending on the state (temperature, deterioration, etc.) of the emission control catalyst 19, and is updated due to the update of the upper limit O2SUMmax and the lower limit O2SUMmin being regularly updated.

Thus, by controlling the oxygen storage O2SUM and the oxygen absorption-storage capability, an air-fuel ratio control can be performed in a good fashion so as to achieve good emission control performance. In order to more actively compute (update) the oxygen absorption-storage capability (O2SUMmax−O2SUMmin), it is conceivable to set an oxygen absorption-storage capability detecting mode in which the air-fuel ratio is forcibly oscillated. If the air-fuel ratio is forcibly oscillated, the upper limit O2SUMmax and the lower limit O2SUMmin are forcibly updated, so that the oxygen absorption-storage capability (O2SUMmax−O2SUMmin) is updated.

Figure 5:
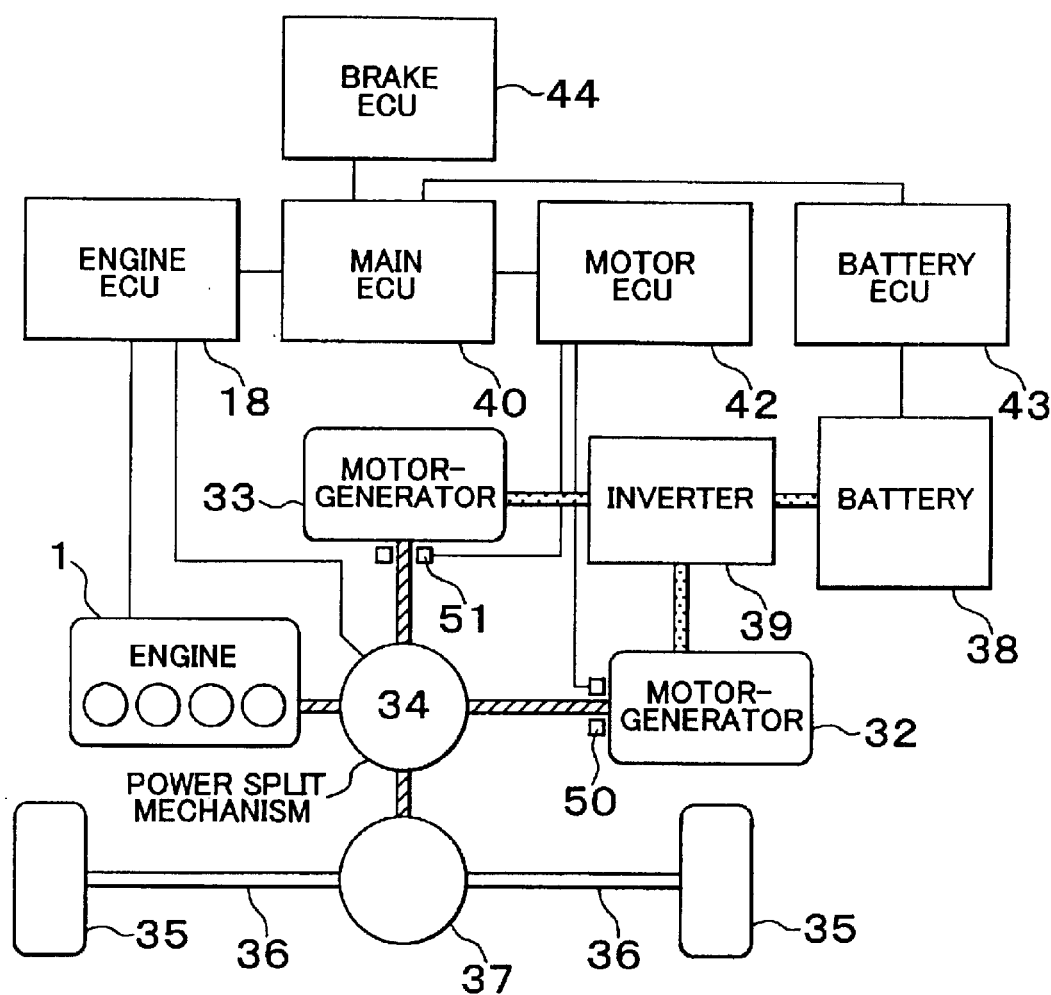
FIG. 5 is a diagram illustrating the construction of a vehicle (hybrid vehicle) having an emission control apparatus in accordance with the invention.

As mentioned above, the vehicle equipped with the engine 1 is a hybrid vehicle that has a motor-generator (MG) 32. FIG. 5 shows a construction of the hybrid vehicle. This vehicle further has a motor-generator (MG) 33 that generates electric power upon receiving output from the engine 1. The engine 1, the MG 32 and the MG 33 are connected by a power split mechanism 34. The power split mechanism 34 distributes the output of the engine 1 to the MG 33 and drive wheels 35. The power split mechanism 34 also serves to transfer the output of the MG 32 to the drive wheels 35, and serves a speed changer regarding the drive force transferred to the drive wheels 35 via a speed reducer 37 and a drive shaft 36. The power split mechanism 34 will be detailed layer.

The MG 32 is an AC synchronous electric motor that is driven by alternating-current power. An inverter 39 converts direct-current power stored in a battery 38 into alternating-current power, and supplies the alternating-current power to the MG 32. Furthermore, the inverter 39 coverts the alternating-current power generated by the MG 33 into direct-current power, and stores it in the battery 38. The MG 33 has a construction that is substantially the same as the construction of the above-described MG 32, and is constructed as an alternating-current synchronous electric motor. Whereas the MG 32 mainly outputs drive force, the MG 33 receives output from the engine 1 and thereby generates electric power.

The MG 32 mainly generates drive force, and also is able to generate electric power using rotation of the drive wheels 35 (regenerative power generation), and therefore functions as a power generator. During this operation, the drive wheels 35 receive brake torque (regenerative brake torque). Therefore, by using the regenerative brake, the foot brake (oil brake) and an engine brake in combination, the vehicle can be braked. On the other hand, the MG 33 receives output of the engine 1 to generate electric power, and also serves as an electric motor that drives upon receiving electric power from the battery 38 via inverter 39.

A crankshaft 45 of the engine 1 is provided with the crank position sensor 14 that detects the piston position and the rotation speed of the engine 1. The crank position sensor 14 is connected to the engine ECU 18. The drive shafts of the MG 32 and the MG 33 are provided with rotation sensors (resolvers) 50, 51 that detect the rotational positions and the rotation speeds of the drive shafts, respectively. The rotation sensors 50, 51 are connected to a motor ECU 42.

Figure 6:
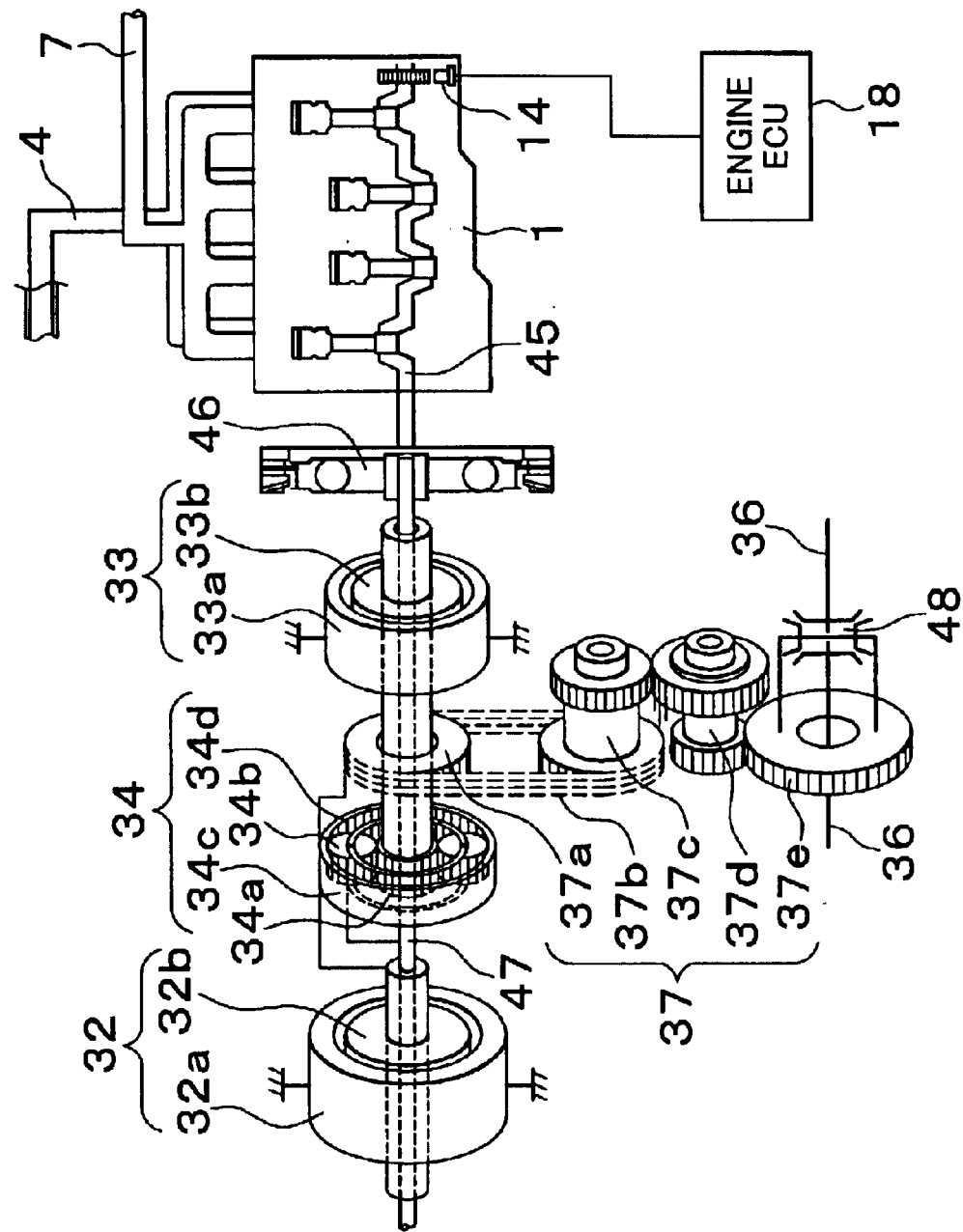
FIG. 6 is a diagram illustrating a relationship between the engine and a motor-generator.

The power split mechanism 34 is shown together with the engine 1, the MG 32 and the MG 33 in FIG. 6. In FIG. 6, the power split mechanism 34 is formed by a planetary gear unit, and the power split mechanism 34 is also referred to as "planetary gear unit 34" below. The power split mechanism 34 is formed by a sun gear 34a, planetary gears 34b disposed around the sun gear 34a, a ring gear 34c disposed around the planetary gears 34b, and a gear carrier 34d retaining the planetary gears 34b.

The crankshaft 45 of the engine 1 is connected to a center shaft 47 via a damper 46. The center shaft 47 is connected to the gear carrier 34d. That is, the output of the engine 1 is input to the gear carrier 34d of the planetary gear unit 34. The MG 32 contains a stator 32a and a rotor 32b. The rotor 32b is connected to the ring gear 34c, and the rotor 32b and the ring gear 34c are connected to a first gear 37a of the speed reducer 37.

The speed reducer 37 is formed by the first gear 37a, a torque transfer chain 37b, a second gear 37c, a third gear 37d, and a final gear 37e. That is, the output of the MG 32 is input to the ring gear 34c of the power split mechanism 34, and is transferred to the drive shafts 36 via the speed reducer 37 and a differential gear 48. As a result, the MG 32 is always connected to the drive shafts 36.

Similarly to the MG 32, the MG 33 contains a stator 33a and a rotor 33b. The rotor 33b is connected to the sun gear 34a. That is, the output of the engine 1 is divided by the power split mechanism 34, and is then input to the rotor 33b of the MG 33 via the sun gear 34a. Furthermore, output of the engine 1, after being divided by the power split mechanism 34, can also be transferred to the drive shafts 36 via the ring gear 34c and the like.

By controlling rotation of the sun gear 34a through control of the amount of electricity generated by the MG 33, the whole power split mechanism 34 can be used as a continuously variable transmission. That is, the output of the engine 1 or (and) the MG 33 is changed in speed by the power split mechanism 34, and is then output to the drive shafts 36. Furthermore, the rotation speed of the engine 1 can be controlled by controlling the amount of electricity generated by the MG 33 (the amount of power consumed, if the MG 33 functions as an electric motor).

The rotation speeds of the MG 32 and the MG 33 are controlled by the motor ECU 42 controlling the inverter 39 with reference to the outputs of the rotation sensors 50, 51. Therefore, the rotation speed of the engine 1 can also be controlled.

These controls are performed by some electronic control units (ECU) (see FIG. 5). The driving of the vehicle by the engine 1 and the driving of the vehicle by the MG 32 and the MG 33, which are characteristics of a hybrid vehicle, are generally controlled by a main ECU 40. The distribution of output between the engine 1 and the MG 32 (MG 33) is determined by the main ECU 40, and various control commands are output to the engine ECU 18 and the motor ECU 42 in order to control the engine 1, the MG 32 and the MG 33.

The engine ECU 18 and the motor ECU 42 send information regarding the engine 1, the MG 32 and the MG 33 to the main ECU 40. The main ECU 40 is connected to a battery ECU 43 for controlling the battery 38 and a brake ECU 44 for controlling the brake. The battery ECU 43 monitors the state of charge of the battery 38. If the state of charge is low, the battery ECU 40 outputs a charging request command to the main ECU 40. Upon receiving the charging request, the main ECU 40 performs a control of causing the MG 33 to generate electricity so as to charge the battery 38. The brake ECU 44 controls the braking of the vehicle, and controls the regenerative control caused by the MG 32, together with the main ECU 40.

Due to the above-described construction, it is possible to achieve a desired operation state of the engine 1 and produce output requested by the vehicle as a whole, by distributing the needed output requested by the entire vehicle between the engine 1 and the MG 32 (MG 33) during the running of the vehicle.

An embodiment of the invention will be described. An apparatus in accordance with the embodiment has a construction as described above. A control in accordance with the embodiment will be described. The above-described vehicle is a hybrid vehicle, and enters an engine stop mode of stopping the engine 1 during a run of the vehicle. During the stop of the engine, the oxygen storage O2SUM is computed (updated) by computing the amount of oxygen absorbed to or released from the emission control catalyst 19. If the engine 1 is restarted after the engine stop mode ends (is discontinued), the air-fuel ratio control is performed based on the oxygen storage O2SUM computed (updated) during the engine stop mode.

By the air-fuel ratio control, the changing of the air-fuel ratio during a predetermined time following the restart is determined Specifically, the changing of the air-fuel ratio means an approximate value of the air-fuel ratio to be maintained, and how long such a value of the air-fuel ratio should be maintained. During the engine stop mode, a great amount of lean gas flows into the emission control catalyst 19 due to an engine drag or the like during a non-combustion state of the engine. Therefore, during the engine stop mode, the emission control catalyst 19 absorbs oxygen. Hence, in many cases, the air-fuel ratio control following the discontinuation of the engine stop mode needs to achieve a rich-side air-fuel ratio. Therefore, on the basis of the storage of oxygen computed during the engine stop mode, a level of rich operation that is preferable in view of the storage of oxygen is computed by the engine ECU 18 and the like. Then, the changing of the air-fuel ratio during the predetermined period following the discontinuation of the engine stop mode is determined. In this operation, it is also possible to factor in the temperature of the emission control catalyst 19 and the like.

Figure 7:
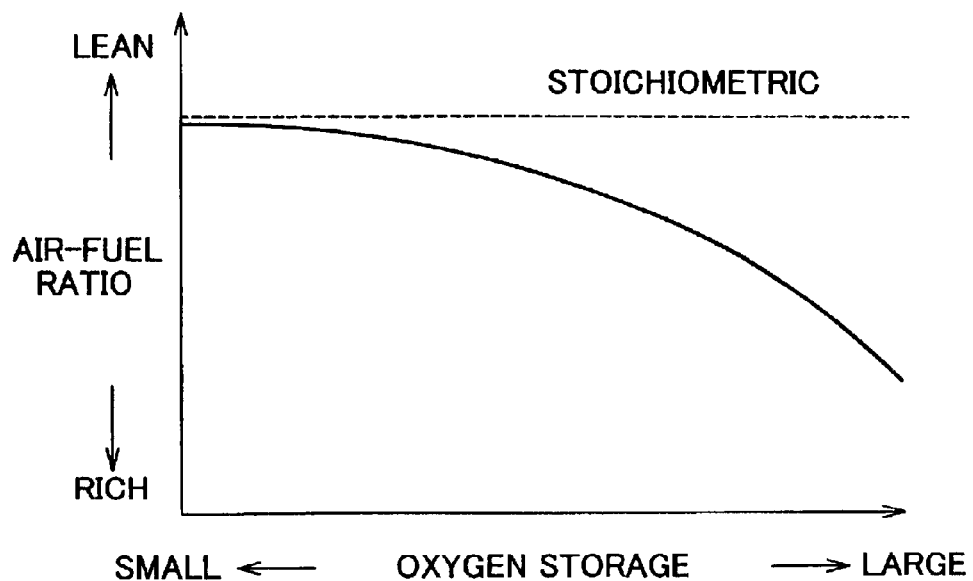
FIG. 7 is a graph indicating tendency between the storage of oxygen and the air-fuel ratio occurring after discontinuation of an engine stop mode.

FIG. 7 shows a graph indicating the tendency between the storage of oxygen computed during the engine stop mode and the air-fuel ratio set after the discontinuation of the engine stop mode. As can be understood from FIG. 7, if the storage of oxygen is large, a richer air-fuel ratio is set, so that rich exhaust gas will flow into the emission control catalyst 19. Through this setting, the storage of oxygen is reduced so as to achieve an optimal state. Furthermore, the changing of air-fuel ratio within the predetermined period following the discontinuation of the engine stop mode is determined. During execution of this determination, the storage of oxygen is computed and updated. The determined changing of air-fuel ratio during the predetermined period may be corrected based on the computed storage of oxygen.

Furthermore, according to the emission control apparatus of this embodiment, it is also possible to operate the engine 1 so as to keep the storage of oxygen within an optimal predetermined range by using the MG 32 during operation of the engine 1, instead of the engine stop mode. Therefore, it becomes possible to more effectively perform emission control utilizing the oxygen absorption-storage action.

As described above, if the emission control catalyst 19 has stored oxygen up to the upper limit of the oxygen absorption-storage capability, there is a danger that sufficient emission control cannot be performed if the air-fuel ratio of the emission gas shifts to the lean side. Conversely, if the emission control catalyst 19 stores substantially no oxygen, there is a danger that sufficient emission control cannot be performed if the air-fuel ratio of exhaust gas shifts to the rich side. Considering these factors, it is preferable to set the target value O2SUMref or the target range of oxygen storage substantially at a middle in the oxygen absorption-storage capability. If, from situation of operation of the vehicle, a rich operation is expected to continue for a certain time, it is also possible to perform a control in which an increased amount of oxygen is stored so as to improve the emission control efficiency.

Therefore, a target range (that may be replaced by a target value O2SUMref) is set regarding the amount of oxygen stored in the emission control catalyst 19, and the engine 1 is operated so that the storage of oxygen is within the predetermined target range. In an ordinary vehicle, it is necessary to meet an output requirement required of the vehicle, and therefore it is impossible to continue the operation of the engine 1 while always giving priority to the storage of oxygen. However, the vehicle of this embodiment is a hybrid vehicle, and has the MG 32 as an output source. Therefore, the vehicle performs a control of adjusting the distribution of output between the engine 1 and the MG 32 so that the storage of oxygen is within the predetermined range. Therefore, the emission control based on the storage of oxygen is more reliably accomplished, so that the emission control efficiency improves. In this embodiment, after a basic distribution is determined based on the amount of charge in the battery 38 and the like, the determined basic distribution is corrected taking the storage of oxygen into consideration.

Figure 8:
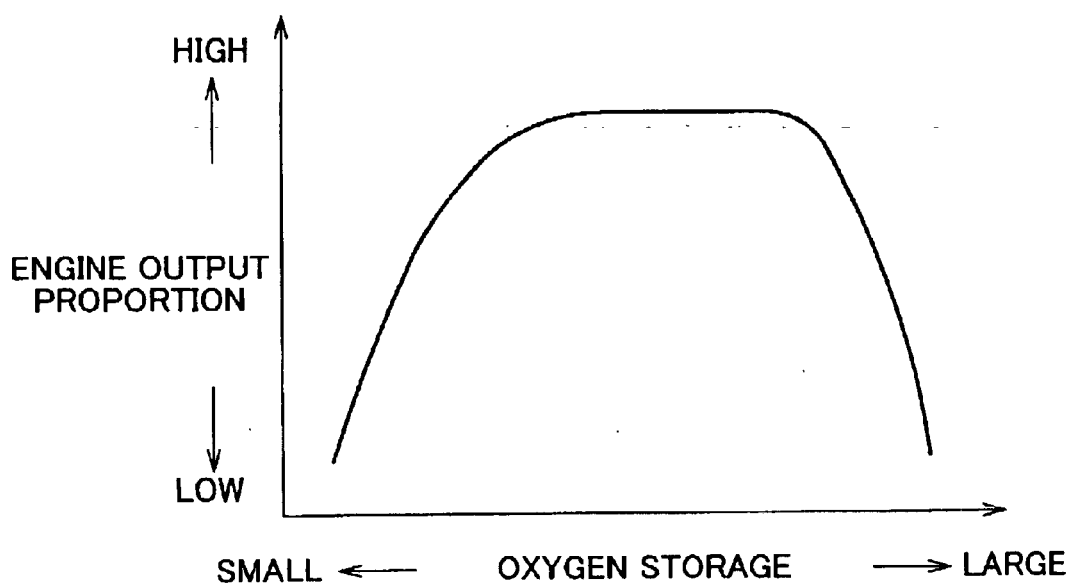
FIG. 8 is a graph indicating tendency between the storage of oxygen and the engine output proportion.

FIG. 8 shows a graph indicating a tendency between the storage of oxygen and the output distribution proportion of the engine 1. As is apparent from FIG. 8, if the storage of oxygen is small or great, the power contribution of the engine is reduced. A state of small storage of oxygen can be said to likely become a state in which the catalyst has completely released oxygen and therefore the emission control based on the oxygen absorption-storage action can not be effectively performed. Conversely, a state of large storage of oxygen can be said to likely become a state in which the catalyst has absorbed oxygen up to the upper limit of the oxygen absorption-storage capability and therefore the emission control based on the oxygen absorption-storage action can not be effectively performed. Therefore, during a large or small oxygen storage state, the output distribution of the engine 1 is reduced so as to prevent a sharp change in the storage of oxygen.

Furthermore, in this embodiment, if the storage of oxygen is within a predetermined range, the normal air-fuel ratio feedback control is performed with regard to the operation of the engine 1. Since the storage of oxygen is within the predetermined range, it can be said that a stable state exists with regard to the emission control based on the oxygen absorption-storage capability. Therefore, in such a case, the normal air-fuel ratio feedback control is performed to improve the emission control efficiency. The air-fuel ratio feedback control is a feedback control that is performed so that the exhaust air-fuel ratio remains at or around the stoichiometric air-fuel ratio based on the exhaust air-fuel ratio detected by the air-fuel ratio sensor disposed on the exhaust passage 7 (the upstream-side air-fuel ratio sensor 25 or the downstream-side air-fuel ratio sensor 26 in this embodiment).

Furthermore, in this embodiment, if it is desired that the oxygen absorption-storage capability be detected (updated), the fuel stop operation and the rich operation of the engine 1 are serially performed so as to detect the oxygen absorption-storage capability at an earlier timing. As for the fuel stop operation and the rich operation of the engine 1, either one of them may precede the other. That is, the sequence of the two operations is arbitrary as long as the two operations are serially performed. As described above, the upper limit value and the lower limit value of the oxygen absorption-storage capability are detected for the computation of the oxygen absorption-storage capability. By performing the fuel stop operation, intake air directly flows into the emission control catalyst 19, that is, an air containing a large amount of oxygen flows in so that the amount of oxygen stored in the emission control catalyst 19 soon reaches the upper limit.

Due to the rich operation performed together with the fuel stop operation on a serial basis, rich exhaust gas flows into the emission control catalyst 19, so that oxygen stored in the emission control catalyst 19 immediately desorbs and the storage of oxygen soon reaches the lower limit. Since the vehicle of the embodiment is a hybrid vehicle, it is possible to produce an output required of the vehicle from the MG 32, despite the fuel stop operation and the rich operation of the engine 1. Therefore, the oxygen absorption-storage capability can be detected at an early timing. Furthermore, by performing the fuel stop operation and the rich operation of the engine 1 suitable for detecting the oxygen absorption-storage capability, the detection of the oxygen absorption-storage capability can be more accurately accomplished.

In the foregoing embodiment, there is a case where combustion is not performed in the engine 1 (fuel is stopped). In this case, the entire output required of the vehicle needs to be provided by the MG 32. Therefore, it is also possible to serially perform the lean operation and the rich operation of the engine 1 in the vicinity of limits within the range of combustible air-fuel ratios. In this manner, the output of the engine 1 can be utilized. Then, a shortfall from the output requested by the whole vehicle or a fluctuation may be offset by the output of the MG 32. This also makes it possible to detect the oxygen absorption-storage capability at an earlier timing. In this case, too, the lean operation and the rich operation near the limits suitable for the detection of the oxygen absorption-storage capability will make it possible to more accurately detect the oxygen absorption-storage capability.

Conventionally, in a vehicle that enters the engine stop mode during a run of the vehicle (a hybrid vehicle as in the foregoing embodiment, and a vehicle equipped with an idle stop system, etc.), the storage of oxygen in the emission control catalyst (oxygen absorption-storage capability thereof) becomes unknown during the engine stop mode, and therefore, there is a fear of emission deterioration after the restarting of the engine 1. However, if the emission control apparatus of the embodiment is provided, the storage of oxygen is computed during the engine stop mode as well, and the air-fuel ratio control following the restart of the engine is performed based on the oxygen absorption-storage capability. Therefore, the emission control performance can be further improved.

Furthermore, it is preferable that the storage of oxygen in the emission control catalyst be maintained within a predetermined range as stated above. In a construction where the vehicle enters the engine stop mode during a run of the vehicle, and the vehicle has a second drive mechanism for driving the vehicle during the engine stop mode as in the foregoing embodiment (in the embodiment, the vehicle is a hybrid vehicle, and has the MG 32), fluctuations in the output required of the vehicle can be absorbed by the second drive mechanism, and the engine 1 can be operated so that the storage of oxygen will be maintained within the predetermined range as much as possible. This will further improve the emission control performance.

A second embodiment will be described. The emission control apparatus of the second embodiment has substantially the same construction as that of the first embodiment. Therefore, detailed description of the construction of the second embodiment will be omitted. Controls in accordance with the second embodiment will be described below. In this embodiment, the discontinuation of output between the engine 1 and the MG 32 is controlled so that the amount of a specific component that flows out of the emission control catalyst will be within a predetermined range. The amount of a specific component means, for example, the amount of oxygen, the amount of carbon monoxide, the amount of nitrogen oxides, or the amount of hydrocarbons. Furthermore, the amount of a specific component may be the amount of a lean component or the amount of a rich component where the lean component is a component contained in exhaust gas if the air-fuel ratio of exhaust gas is on the lean side, and the rich component is a component contained in exhaust gas if the air-fuel ratio of exhaust gas is on the rich side.

If the amount of a specific component is the amount of oxygen, the control of the second embodiment becomes substantially the same as the above-described control based on the oxygen absorption-storage action. The amount of oxygen in outflow exhaust gas can be detected by the downstream-side air-fuel ratio sensor 26. If exhaust gas flowing out of the emission control catalyst 19 contains oxygen, it can be said that the emission control catalyst 19 has not already be able to absorb oxygen. Conversely, if exhaust gas flowing out of the emission control catalyst 19 does not contain oxygen, it can be said that the emission control catalyst 19 is still able to absorb oxygen. By controlling the output distribution so that the amount of oxygen let out of the emission control catalyst 19 is within a predetermined range, a control substantially the same as that in the first embodiment can be performed.

If the amount of a specific component is the amount of carbon monoxide, the amount of nitrogen oxides or the amount of hydrocarbons, emission control can be accomplished by setting the predetermined range such that the amount of the component will be reduced (set the range with zero being a target range). Furthermore, by controlling the output distribution so that the amount of the component will be within a predetermined range, it is also possible to improve the emission control performance. Furthermore, if the aforementioned specific component is the rich component or the lean component, the emission control performance can also be improved by performing a control such that the amount of the rich or lean component will be within a predetermined range.

If the emission control appratus of this invention is not limited to the foregoing embodiments. For example, in the foregoing embodiment, the history of oxygen storage O2SUM is updated with respect to the standard (O2SUM=0) being the oxygen storage O2SUM occurring at a certain time point. Therefore, the oxygen storage O2SUM can assume positive and negative values. However, it is also possible to detect a state where the emission control catalyst 19 has completely released oxygen and set this point as a standard (O2SUM=0). In this case, the oxygen storage O2SUM assumes only positive values, and an upper limit O2SUMmax is set while a lower limit O2SUMmin is not set. The upper limit O2SUMmax equals to the oxygen absorption-storage capability. In this case, it is conceivable to perform control only at the side of the upper limit O2SUMmax instead of performing a control using the upper limit O2SUMmax and the lower limit O2SUMmin.

Although in the foregoing embodiments, the oxygen storage O2SUM is updated based on the output of the upstream-side air-fuel ratio sensor 25, this is not restrictive. That is, it is also possible to employ other methods, for example, a method in which the oxygen storage O2SUM of the emission control catalyst 19 is updated based on the amount of intake air Ga and the amount of fuel injected TAU.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. An emission control apparatus of an internal combustion engine that has an engine stop mode of stopping the internal combustion engine during a run of a vehicle, comprising:

an emission control catalyst disposed in an exhaust passage of the internal combustion engine;

a storage computing device that computes a storage of oxygen in the emission control catalyst; and an air-fuel ratio controller that performs an air-fuel ratio control of the internal combustion engine based on the storage of oxygen computed by the storage computing device, wherein the storage computing device computes the storage of oxygen during the engine stop mode of the internal combustion engine at which time no exhaust gas is emitted, and wherein the air-fuel ratio controller performs the air-fuel ratio control when the internal combustion engine is restarted after the engine stop mode is discontinued, based on the storage of oxygen computed by the storage computing device during the engine stop mode.

2. The emission control apparatus according to claim 1, wherein when the air-fuel ratio control is performed at a time of a restart of the internal combustion engine, the air-fuel ratio controller determines a change in the air-fuel ratio within a predetermined time following a restart of the internal combustion engine, based on the storage of oxygen computed by the storage computing device during the engine stop mode.

3. A control method for an emission control apparatus of an internal combustion engine that has an engine stop mode of stopping the internal combustion engine during a run of a vehicle, the emission control apparatus utilizing an oxygen absorption-storage action of an emission control catalyst disposed in an exhaust passage of the internal combustion engine, the control method comprising the steps of:

computing a storage of oxygen during the engine stop mode of the internal combustion engine at which time no exhaust gas is emitted; and performing an air-fuel ratio control when the internal combustion engine is restarted after the engine stop mode is discontinued, based on the storage of oxygen computed during the engine stop mode.

4. An emission control apparatus of an internal combustion engine of a hybrid vehicle that is run via the internal combustion engine and an electric motor, comprising:

an emission control catalyst disposed in an exhaust passage of the internal combustion engine;

an output distribution controller that controls a distribution between an output of the internal combustion engine and an output of the electric motor;

a storage computing device that computes a storage of oxygen in the emission control catalyst; and an air-fuel ratio controller that performs an air-fuel ratio control of the internal combustion engine based on the storage of oxygen computed by the storage computing device, wherein the output distribution control device controls the distribution of output between the internal combustion engine and the electric motor based on a condition parameter of an exhaust system of the internal combustion engine, wherein the storage computing device computes the storage of oxygen during the engine stop mode of the internal combustion engine, and wherein the air-fuel ratio controller performs the air-fuel ratio control when the internal combustion engine is restarted after the engine stop mode is discontinued, based on the storage of oxygen computed by the storage computing device during the engine stop mode.

5. The emission control apparatus according to claim 4, wherein when the air-fuel ratio control is performed at a time of a restart of the internal combustion engine, the air-fuel ratio controller determines a change in the air-fuel ratio within a predetermined time following a restart of the internal combustion engine, based on the storage of oxygen computed by the storage computing device during the engine stop mode.

6. An emission control apparatus of an internal combustion engine of a hybrid vehicle that is run via the internal combustion engine and an electric motor, comprising:

an emission control catalyst disposed in an exhaust passage of the internal combustion engine; and an output distribution controller that controls a distribution between an output of the internal combustion engine and an output of the electric motor, wherein the output distribution controller controls the distribution of output between the internal combustion engine and the electric motor so that an amount of a specific component in an exhaust gas that flows out of the emission control catalyst is within a predetermined range.

7. The emission control apparatus according to claim 6, wherein if the amount of the specific component in the exhaust gas that flows out of the emission control catalyst is within the predetermined range, an air-fuel ratio feedback control based on an exhaust air-fuel ratio is performed.

8. A control method for an emission control apparatus of an internal combustion engine of a hybrid vehicle that is run via the internal combustion engine and an electric motor, the emission control apparatus utilizing an emission control catalyst disposed in an exhaust passage of the internal combustion engine, the control method comprising the steps of:

computing an amount of a specific component in an exhaust gas the flows out of the emission control catalyst; and controlling a distribution of output between the internal combustion engine and the electric motor so that the amount of the specific component is within a predetermined range.

9. An emission control apparatus of an internal combustion engine of a hybrid vehicle that is run via the internal combustion engine and an electric motor, comprising:

an emission control catalyst disposed in an exhaust passage of the internal combustion engine;

an absorption-storage capability computing device that computes an oxygen absorption-storage capability of the emission control catalyst; and an output distribution controller that controls a distribution between an output of the internal combustion engine and an output of the electric motor, wherein the absorption-storage capability computing device computes the oxygen absorption-storage capability by serially performing a fuel stop and a rich operation, and wherein at a time of computation of an oxygen absorption-storage capability by the absorption-storage capability computing device, the output distribution controller controls the distribution of output between the internal combustion engine and the electric motor so as to provide an output required of the vehicle.

10. The emission control apparatus according to claim 9, further comprising:

a storage computing device that computes a storage of oxygen in the emission control catalyst; and an air-fuel ratio controller that performs an air-fuel ratio control of the internal combustion engine based on the storage of oxygen computed by the storage computing device, wherein the storage computing device computes the storage of oxygen during the engine stop mode of the internal combustion engine, and wherein the air-fuel ratio controller performs the air-fuel ratio control when the internal combustion engine is restarted after the engine stop mode is discontinued, based on the storage of oxygen computed by the storage computing device during the engine stop mode.

11. The emission control apparatus according to claim 10, wherein when the air-fuel ratio control is performed at a time of a restart of the internal combustion engine, the air-fuel ratio controller determines a change in the air-fuel ratio within a predetermined time following a restart of the internal combustion engine, based on the storage of oxygen computed by the storage computing device during the engine stop mode.

12. A control method for an emission control apparatus of an internal combustion engine of a hybrid vehicle that is run via the internal combustion engine and an electric motor, the emission control apparatus utilizing an oxygen absorption-storage action of an emission control catalyst disposed in an exhaust passage of the internal combustion engine, the control method comprising the steps of:

computing an oxygen absorption-storage capability by serially performing a fuel stop and a rich operation, and at a time of computation of an oxygen absorption-storage capability, controlling a distribution of output between the internal combustion engine and the electric motor so as to provide an output required of the vehicle.

13. An emission control apparatus of an internal combustion engine of a hybrid vehicle that is run via the internal combustion engine and an electric motor, comprising:

an emission control catalyst disposed in an exhaust passage of the internal combustion engine;

an absorption-storage capability computing device that computes an oxygen absorption-storage capability of the emission control catalyst; and an output distribution controller controls a distribution between an output of the internal combustion engine and an output of the electric motor, wherein the absorption-storage capability computing device computes the oxygen absorption-storage capability by serially performing a lean operation and a rich operation near a limit within a maximum range of combustible air-fuel ratios, and wherein at a time of computation of an oxygen absorption-storage capability by the absorption-storage capability computing device, the output distribution controller controls the distribution of output between the internal combustion engine and the electric motor so as to provide an output required of the vehicle.

14. The emission control apparatus according to claim 13, further comprising:

a storage computing device that computes a storage of oxygen in the emission control catalyst; and an air-fuel ratio controller that performs an air-fuel ratio control of the internal combustion engine based on the storage of oxygen computed by the storage computing device, wherein the storage computing device computes the storage of oxygen during the engine stop mode of the internal combustion engine, and wherein the air-fuel ratio controller performs the air-fuel ratio control when the internal combustion engine is restarted after the engine stop mode is discontinued, based on the storage of oxygen computed by the storage computing device during the engine stop mode.

15. The emission control apparatus according to claim 14, wherein when the air-fuel ratio control is performed at a time of a restart of the internal combustion engine, the air-fuel ratio controller determines a change in the air-fuel ratio within a predetermined time following a restart of the internal combustion engine, based on the storage of oxygen computed by the storage computing device during the engine stop mode.

16. A control method for an emission control apparatus of an internal combustion engine of a hybrid vehicle that is run via the internal combustion engine and an electric motor, the emission control apparatus utilizing an oxygen absorption-storage action of an emission control catalyst disposed in an exhaust passage of the internal combustion engine, the control method comprising the steps of:

computing an oxygen absorption-storage capability by serially performing a lean operation and a rich operation near a limit within a maximum range of combustible air-fuel ratios, and at a time of computation of an oxygen absorption-storage capability, controlling a distribution of output between the internal combustion engine and the electric motor so as to provide an output required of the vehicle.

* * * * *